(12) United States Patent
Betts

(10) Patent No.: US 8,672,725 B1
(45) Date of Patent: Mar. 18, 2014

(54) PHOTOGRAPHIC CAMOUFLAGED SCENT-FREE GAME CALLS AND METHOD OF MANUFACTURING SAME

(71) Applicant: Christopher R. Betts, North Liberty, IA (US)

(72) Inventor: Christopher R. Betts, North Liberty, IA (US)

( * ) Notice: Subject to any disclaimer, the term of this patent is extended or adjusted under 35 U.S.C. 154(b) by 0 days.

(21) Appl. No.: 13/847,314

(22) Filed: Mar. 19, 2013

Related U.S. Application Data

(60) Provisional application No. 61/719,183, filed on Oct. 26, 2012.

(51) Int. Cl.
*A63H 5/00* (2006.01)

(52) U.S. Cl.
USPC .......................................... 446/207; 446/397

(58) Field of Classification Search
USPC .......................................... 446/202–209, 397
See application file for complete search history.

(56) References Cited

U.S. PATENT DOCUMENTS

| | | | | |
|---|---|---|---|---|
| 2,518,616 | A * | 8/1950 | Herter | 446/209 |
| 2,730,836 | A * | 1/1956 | Faulk et al. | 446/207 |
| 3,066,444 | A * | 12/1962 | Dieckmann | 446/207 |
| 4,151,678 | A * | 5/1979 | Robertson | 446/209 |
| 4,816,259 | A * | 3/1989 | Matthews et al. | 424/463 |
| 4,950,201 | A * | 8/1990 | Sceery | 446/207 |
| 4,968,283 | A * | 11/1990 | Montgomery | 446/419 |
| 5,019,008 | A * | 5/1991 | Hughes | 446/207 |
| 5,090,937 | A * | 2/1992 | LaRue et al. | 446/207 |
| 5,484,320 | A * | 1/1996 | Becker | 446/418 |
| 5,778,590 | A * | 7/1998 | Browning et al. | 42/96 |
| 6,527,614 | B1 * | 3/2003 | Primos | 446/207 |
| 7,608,002 | B2 * | 10/2009 | Eastman et al. | 473/578 |
| 7,658,660 | B1 * | 2/2010 | Drury | 446/206 |
| 8,287,631 | B2 * | 10/2012 | Baum et al. | 106/18.33 |
| 2003/0104884 | A1 * | 6/2003 | Eastman, II | 473/578 |
| 2005/0133947 | A1 * | 6/2005 | Jang | 264/162 |
| 2005/0150073 | A1 * | 7/2005 | Sham | 15/320 |
| 2006/0141185 | A1 * | 6/2006 | Takahashi | 428/35.7 |
| 2008/0274318 | A1 * | 11/2008 | Takada et al. | 428/36.9 |
| 2008/0297685 | A1 * | 12/2008 | Sugibayashi et al. | 349/58 |
| 2009/0017269 | A1 * | 1/2009 | Johnson | 428/195.1 |
| 2011/0265953 | A1 * | 11/2011 | Kroell | 156/378 |

OTHER PUBLICATIONS

Flambeau Painted Lady Duck Call Lure by Flambeau; Image from Amazon.com.
Willie's Camo Max Duck Call by Willie Robertson; Image from L.L. Bean website.

* cited by examiner

*Primary Examiner* — Gene Kim
*Assistant Examiner* — Alyssa Hylinski
(74) *Attorney, Agent, or Firm* — Simmons Perrine Moyer Bergman PLC

(57) ABSTRACT

A scent-free game call mouthpiece section, with a photographic camouflaged or photographic decorative image displayed thereon, in a manner such that paint fragments and VOCs from the camouflaged or decorative image are restrained from contacting the mouth of the game call user, or otherwise being released into the atmosphere around the game call.

17 Claims, 2 Drawing Sheets

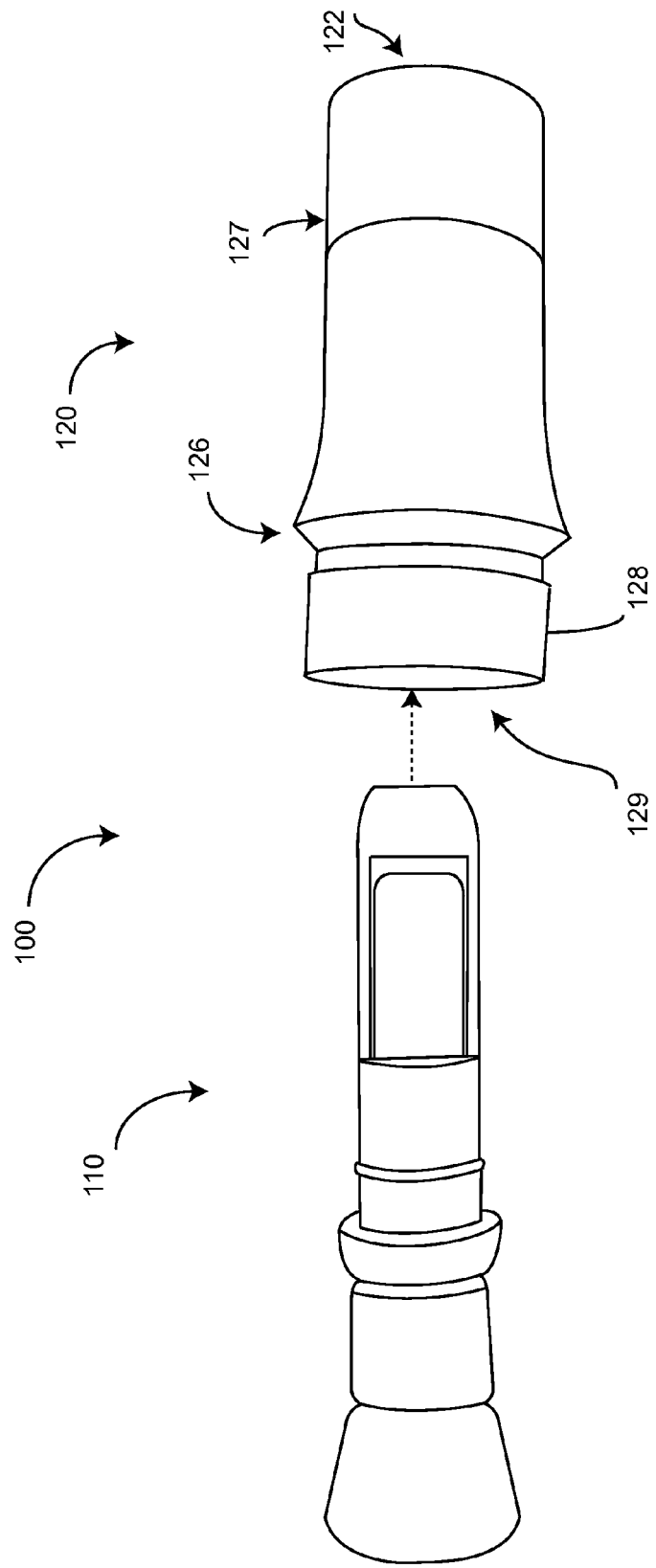

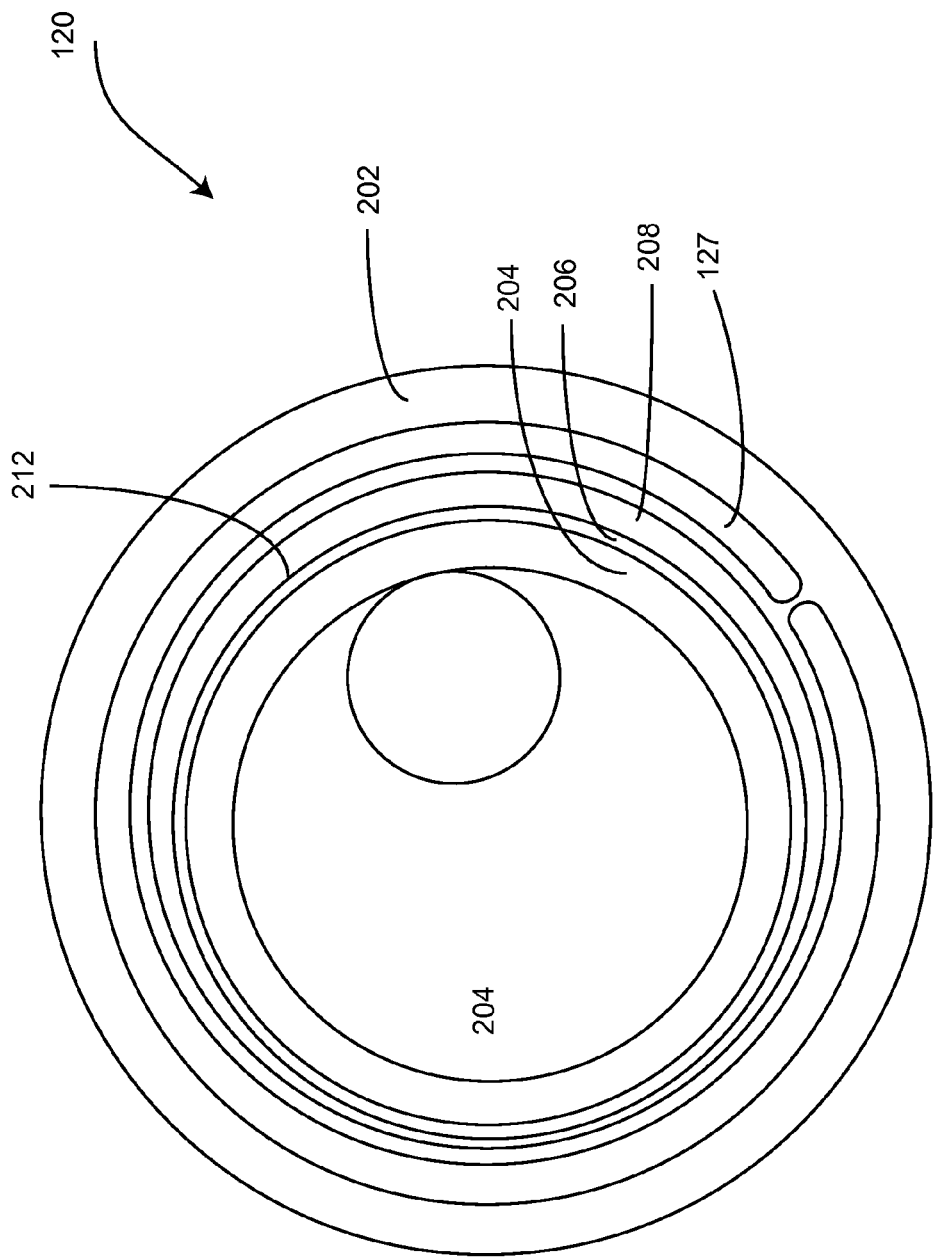

US 8,672,725 B1

PHOTOGRAPHIC CAMOUFLAGED SCENT-FREE GAME CALLS AND METHOD OF MANUFACTURING SAME

BACKGROUND OF THE INVENTION

The present invention generally relates to game calls and, more particularly, to camouflaged and decorative game calls.

In the past, it is well known to have painted game calls, where the exterior of the call is painted with various patterns or images.

Camouflage calls have been painted for many years, and have enjoyed considerable success in the past. However, these calls have had several drawbacks.

When these painted calls are used, they usually are exposed to moisture and are frequently subjected to physical impacts, which can dent or scratch the exterior surface of the call, increasing the potential for paint fragmentation to occur. Since, by their design, calls are made to contact the mouth of the hunter, ingestion of minute paint fragments from the exterior painted surface is a distinct possibility. Additionally, camouflaged game calls may have been painted with paint containing undesirable compounds, such as latex, which can be problematic for some hunters, or Volatile Organic Compounds, or VOCs, which may cause an undesirable effluent of VOCs, which could be especially problematic if used with a deer grunt call or an elk bugle call, where even the smallest unnatural scent could possibly be recognized by such big game animals as something to avoid.

Consequently, there exists a need for improved methods and apparatuses for providing calls which are camouflaged, or otherwise decorated, while minimizing the potential for ingestion of paint fragments, and reducing the problems associated with VOCs emanating from a painted surface.

SUMMARY OF THE INVENTION

It is an object of the present invention to provide enhanced abilities to reduce ingestion of paint fragments, and release of VOCs from painted surfaces, while using hunting game calls.

It is a feature of the present invention to include in the game call, an inner acrylic tube with a patterned image thereon.

It is an advantage of the present invention to reduce paint fragment ingestion and VOC release from painted surfaces.

It is another object of the present invention to provide for increased ability to accommodate lathe customization of a game call blank after a patterned image has been applied.

It is another feature of the present invention to provide a transparent molded epoxy resin layer exterior to the surface of the patterned image.

It is another advantage of the present invention to create a market for unfinished game call blanks which have a painted decorative pattern thereon, which can be customized by turning on a lathe without disturbing the painted decorative pattern.

The present invention is an improved method and apparatus for providing customized and customizable game calls and game call blanks, which improvement is designed to satisfy the aforementioned needs, provide the previously stated objectives, include the above-listed features, and achieve the already articulated advantages. The present invention is carried out in a "paint fragment and paint VOC-less" system in the sense that a substantial reduction in number of paint fragments that will be ingested and paint VOCs released by the painted game call of the present invention.

Accordingly, the present invention is a scent-free game call with an internal printed image comprising:

A reed insert;

A reed insert cover that has an internal photographic image that, when open to the atmosphere, releases VOCs; and Is visible through an outer transparent layer, which seals said internal photographic image, and prohibits VOCs from being released into the atmosphere, by said internal photographic image.

BRIEF DESCRIPTION OF THE DRAWINGS

The invention may be more fully understood by reading the following description of preferred embodiments of the invention, in conjunction with the appended drawings wherein:

FIG. 1 is an exploded perspective view of a game call of the present invention.

FIG. 2 is an enlarged end-view of the game call of FIG. 1.

DETAILED DESCRIPTION

Now referring to the drawings, wherein like numerals refer to like matter throughout, and more particularly to FIG. 1, there is shown a camouflaged game call 100 of the present invention, which includes a camouflaged game call reed/hand piece insert 110, and a camouflaged game call mouthpiece/reed cover 120. The call is shown in an all white camouflage but other more elaborate patterns of contrasting colors could be substituted as well. Camouflaged game call reed/hand piece insert 110 is shown as a double reed duck call insert, however, this is merely an example of many different inserts which could be utilized to make many different types of game calls. The present invention is focused upon the camouflaged game call mouthpiece/reed cover 120 which is adapted and configured to receive whatever insert is utilized for any particular call application. Camouflaged game call mouthpiece/reed cover 120 is shown as a camouflage call; however the image or pattern that is displayed is variable with many different types of camouflage, and many different types of decorative and non-camouflage patterns. The camouflaged game call mouthpiece/reed cover 120 has a mouth contact end 122 and an opposing reed insertion end 129. Camouflaged game call mouthpiece/reed cover 120 is shown with a lathe-turned contoured outer epoxy resin surface 126 which is transparent, and permits the camouflage image to be seen clearly. There is also shown an optional internal information displaying ring 127, which could be decorative or used to provide information about the call, such as manufacturers' name, model and even a serial number for custom calls. Optional internal information displaying ring 127 is disposed outside of the camouflage image, but inside of the lathe-turned contoured outer epoxy resin surface 126. Also shown is an optional exterior decorative ring 128, which is shown as a ring which matches the camouflaged game call reed/hand piece insert 110, and is disposed outside of the lathe-turned contoured outer epoxy resin surface 126.

Now referring to FIG. 2, there is shown an end-view of the camouflaged game call mouthpiece/reed cover 120 of FIG. 1. Camouflaged game call mouthpiece/reed cover 120 is shown as having a clear epoxy resin exterior surface 202, which is similar to the lathe-turned contoured outer epoxy resin surface 126 of FIG. 1, except that it is not as thick as the thickest portion shown in FIG. 1. Camouflaged game call mouthpiece/reed cover 120 comprises an acrylic inner tube 204, which has had applied thereto an acrylic inner tube base-coat paint 206. Applied to the acrylic inner tube base-coat paint 206, is acrylic inner tube patterned image 208. Clear epoxy resin interior surface 212 is shown disposed adjacent to acrylic inner tube patterned image 208; however, there may be a very thin layer of VOC clear coat applied over the acrylic inner tube patterned image 208, and therefore between the acrylic inner tube patterned image 208 and the clear epoxy resin interior surface 212. Also shown is optional internal information displaying ring 127.

The present invention can be manufactured using the following process:

1) Full length 36" acrylic tubes are cut into 2⅝ inch (2.625) length sections. Each cut section is then hand sanded, at both ends, to ensure a smooth and clean finish (see FIG. 2 #204). Each cut tube is then cleaned, with Alcohol, to rid the substrate of any contaminates, and installed onto "jigs" (12 tubes per jig). Each Jig is then transferred to the spray booth, where the tubes go through another cleaning using Lacquer thinner. This process eliminates any further contaminates and prepares the tubes for their base-coat color.

2) Once the acrylic tubes 204 have dried, the base-coat 206 is now applied to the tubes in preparation for the next step, which is the Hydrographic Printing (depending upon the style/effect that is to be achieved; the base-coat 206 can be Waterborne, designed specifically for Hydrographic Printing, or VOC style paint).

3) After the base-coat 206 has been allowed to dry thoroughly, they are removed from the paint booth to the dipping area. Once in the dipping area, a printed pattern PVA (polyvinyl alcohol) film is cut to size for each jig that is to be hydro-dipped. The cut film is then transferred over to a specially designed dipping tank, where it lays suspended on heated water at 39 degree C. to hydrate the film for approximately 60 seconds. (*note: temperature and time varies depending upon manufacturer/style of printed pattern.)

Once the hydration period ends, an "activator", specially manufactured to use in Hydrographic printing, is applied with a spray gun to the top of the film as it lies on the water. This releases the ink from the PVA film and the ink is now floating on the water. The base-coated tubes, which are in sets of 12 per jig, are then strategically dipped through the floating ink at a specific angle. As the tubes are being submerged through the floating ink, the ink/film 208 wraps around the tubes and becomes "infused"/etched onto the base-coat. When fully submerged, the tubes are completely wrapped in the pattern 208 and are then taken to the rinse area, where they remain for three to five minutes to remove any and all residue left behind from the activated film. They are then removed from the rinse area, blown off with air to remove excess water, and then hung on a rack to dry thoroughly.

4) After the tubes have dried completely, they are transferred to the spray booth, where a VOC clear coat is applied to preserve the image 208 from any damage; and remain there until the clear coat has completely dried. Once dry, the tubes are ready to be transferred to the molding boxes.

5) Molding boxes can be specifically designed and fabricated from Aluminum and Silicone molding material, which could be AeroMarine 128 Silicone Moldmaking Rubber (available from AeroMarine Products Inc. of 8659 Production Avenue San Diego, Calif. 92121) to meet the specs in the design of the duck calls. "Dummy" blanks could be used in making the silicone mold to achieve the specifications and dimensions of the actual duck call "blanks". The box dimensions are approximately 3" w×4" h×34" l, and can generate 12 calls per box. The front plate on each box is removable to allow access for extraction of the molded pieces, which are referred to as "blanks".

6) Each hydro-dipped tube 204, 206 and 208 (also optional internal information displaying ring 127 could be included at this point) is then transferred to a ⅝" aluminum rod, where each end of the decorated tube is sealed with 401 Locktite to prevent air bubbles from forming due to the heat generated by the epoxy curing during the molding process. While the sealant is drying, the silicone mold is being prepared by applying petroleum jelly to all exposed areas of the mold as a releasing agent. The aluminum rods, with the decorated tubes, are then inserted into the box, leaving the tube suspended and centered in each of the 12 areas where the blanks are formed. The box is then assembled and transferred to the pouring area.

7) A mixture of Cycloaliphatic Clear Epoxy resin, which could be AeroMarine Cycloaliphatic "Non Blushing" Clear Epoxy #300/21 (and is available from AeroMarine Products Inc. of 8659 Production Avenue San Diego, Calif. 92121) is mixed (2:1 ratio) and is then poured into each mold of 12 until full, and allowed to cure. This resin is a latex-free food-safe resin. Other similar resins could be used as well. Cure time varies between 8-12 hours, depending upon external room temperature. Once the epoxy has cured, each box is then disassembled and the call "blanks" are removed from the mold, and inspected for defects/bubbles.

8) FIG. 2 is a cross-sectional picture of the encapsulated tube in the epoxy resin lathe-turned contoured outer epoxy resin surface 126.

9) The blank, i.e. camouflaged game call mouthpiece/reed cover 120, is shown after machining to desired shape. It was mounted on an expanding mandrel for the lathe. Once the desired shape is established, you can then finish with a final polish and buffing. If desired, a decorative band, i.e. optional exterior decorative ring 128, can be added at this stage as well by using an arbor press and pressing the band on the base of the machined and polished part.

The terms camouflage and camouflaged are intended to mean more than just one particular type or style of camouflage. Many commercial and well known designer camouflage patterns exist. The means of the term is intended to be inclusive, and a call which is all white could be considered camouflaged for winter use.

It is thought that the method and apparatus of the present invention will be understood from the foregoing description, and it will be apparent that various changes may be made in the form, construction, steps and arrangement of the parts and steps thereof, without departing from the spirit and scope of the invention, or sacrificing all of the material advantages, the form herein described being merely a preferred or exemplary embodiment thereof.

I claim:

1. A photographically patterned camouflage scent-free game call comprising:
   A game call reed insert;
   A game call reed cover, which is matched with said game call reed insert, so that when said game call reed insert is inserted into said game call reed cover, and air is blown through said game call reed cover, a sound is made which emulates a sound made by an animal;
   Said game call reed cover further comprising:
      an acrylic inner tube having an inner cylindrical surface and an outer cylindrical surface; said inner cylindrical surface being sized and configured to receive and to retain, with friction therein, a portion of said game call reed insert, said outer cylindrical surface being free of any intermediate contour portions and any terminal contour portions;
      a cylindrical wrapped-patterned image disposed on said acrylic inner tube;
      where said cylindrical wrapped-patterned image is wrapped around said acrylic inner tube;
      an outer epoxy resin layer;

said outer epoxy resin being food safe, latex free and free of volatile organic compounds (VOCs) and configured to seal in any scents which may emanate from said cylindrical wrapped-patterned image;

said outer epoxy resin layer being transparent and having a contoured differential thickness characteristic, through which said cylindrical wrapped-patterned image can be seen and which is consistent with removal of a portion of said outer epoxy resin layer by turning on a lathe; and a polished, lathe-turned contoured outer epoxy resin surface on said outer epoxy resin layer.

2. The game call of claim 1 further comprising a base-coat paint disposed on said outer cylindrical surface of said acrylic inner tube, and where said base-coat paint, when exposed to the atmosphere, releases VOCs to the atmosphere.

3. The game call of claim 2, further comprising a clear-coat which inhibits release of said VOCs to the atmosphere.

4. The game call of claim 3, wherein said outer epoxy resin layer eliminates release of VOCs from said game call.

5. The game call of claim 1, further comprising a decorative band disposed between said cylindrical wrapped-patterned image and said outer epoxy resin layer, comprising text such that such text is legible through said outer epoxy resin layer.

6. The game call of claim 5, wherein said text is an identification number, which uniquely identifies the game call, and wherein said game call is a duck call.

7. The game call of claim 6, wherein said game call reed insert is a double reed insert.

8. A scent-free game call with an internal printed image comprising:

A reed insert;

A reed insert cover that comprises a tube which has an outer cylindrical surface and has an internal cylindrical wrapped photographic image that is disposed on said outer cylindrical surface, said outer cylindrical surface being free of any intermediate contour portions and any terminal contour portions;

Said reed insert cover further comprises a contoured outer transparent layer with differential diameter characteristics and the cylindrical wrapped photographic image is visible through the outer transparent layer, which seals said internal cylindrical wrapped photographic image, and prohibits scent from being released into the atmosphere by said internal cylindrical wrapped photographic image.

9. A method of making a scent-free printed game call comprising the steps of:

Providing a game call reed insert; comprising:
a reed;
a sounding board, disposed immediately adjacent to said reed;
a hollow handle end coupled to said sounding board;
providing a tube having an inner cylindrical surface and an outer cylindrical surface; said inner cylindrical surface being sized and configured to receive and to retain, with friction therein, a portion of said game call reed insert, including said sounding board and said reed, and said outer cylindrical surface being free of any intermediate contour portions and any terminal contour portions;

floating a film on a liquid, wherein said film comprises a marking substance, which is arranged in a predetermined image pattern;

wrapping and adhering said film around said outer cylindrical surface by dipping said tube into said liquid and thereby creating a cylindrical wrapped image;

molding a transparent resin cover over said film to form a reed insert cover;

wherein said film is a paint comprising VOCs and said transparent resin cover, further performing a function of providing a barrier, which is impervious to said VOCs, so as to create a scent-free reed cover;

turning said reed insert cover on a lathe and removing portions of the transparent resin cover, and thereby creating a contoured cover exterior surface; and polishing said cover exterior surface to facilitate light transmission through said transparent resin cover, so that said predetermined image pattern is visible through said transparent resin cover.

10. The method of claim 9, further comprising the steps of:
Before said step of floating a film;
Applying a base-coat layer to said outer cylindrical surface.

11. The method of claim 10, wherein said base-coat layer is a layer of paint in a single color.

12. The method of claim 11, further comprising the steps of, after said step of wrapping said film, applying a clear coat layer to said film to protect said predetermined image pattern, so that said transparent resin cover is exterior of said clear coat layer.

13. The method of claim 12, wherein said transparent resin cover is made transparent by said step of polishing.

14. The method of claim 13, wherein said predetermined image pattern is a photographic image.

15. The method of claim 14, wherein said photographic image is a photographic camouflage image.

16. The method of claim 9, further comprising the steps of, after said step of wrapping said film, and before said step of molding a transparent resin cover, applying a first decorative band containing descriptive text about a portion of said film.

17. The method of claim 16, further comprising disposing a second decorative band about a portion of said transparent resin cover.

\* \* \* \* \*